United States Patent
Ahn et al.

(10) Patent No.: US 10,187,887 B2
(45) Date of Patent: Jan. 22, 2019

(54) METHOD AND DEVICE FOR TRANSMITTING DATA IN UNLICENSED BAND

(71) Applicant: LG ELECTRONICS INC., Seoul (KR)

(72) Inventors: Joonkui Ahn, Seoul (KR); Byounghoon Kim, Seoul (KR); Hanbyul Seo, Seoul (KR); Yunjung Yi, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 15/322,058

(22) PCT Filed: Jun. 26, 2015

(86) PCT No.: PCT/KR2015/006575
§ 371 (c)(1),
(2) Date: Dec. 23, 2016

(87) PCT Pub. No.: WO2015/199494
PCT Pub. Date: Dec. 30, 2015

(65) Prior Publication Data
US 2017/0150500 A1    May 25, 2017

Related U.S. Application Data

(60) Provisional application No. 62/075,901, filed on Nov. 6, 2014, provisional application No. 62/017,806, filed on Jun. 26, 2014.

(51) Int. Cl.
*H04W 4/00* (2018.01)
*H04W 72/04* (2009.01)
(Continued)

(52) U.S. Cl.
CPC .......... *H04W 72/0446* (2013.01); *H04L 5/14* (2013.01); *H04W 28/02* (2013.01);
(Continued)

(58) Field of Classification Search
CPC ..................................................... H04W 72/04
See application file for complete search history.

(56) References Cited

U.S. PATENT DOCUMENTS

| 8,275,323 B1 * | 9/2012 | Shirali | H04W 72/04 455/67.11 |
| 2008/0084835 A1 * | 4/2008 | Goel | H04W 72/04 370/310 |

(Continued)

FOREIGN PATENT DOCUMENTS

| EP | 1289194 A1 | 3/2003 |
| KR | 10-2014-0017517 A | 2/2014 |

OTHER PUBLICATIONS

"3GPP TS 36.211 V10.2.0 (Jun. 2011): 3rd Generation Partnership Project; Technical Specification Group Radio Access Network; Evolved Universal Terrestrial Radio Access (E-UTRA); Physical Channels and Modulation (Release 10)", 3GPP Organizational Partners, 2011, 103 pages.

(Continued)

*Primary Examiner* — Farah Faroul
(74) *Attorney, Agent, or Firm* — Birch, Stewart, Kolasch & Birch, LLP

(57) ABSTRACT

Provided is a method and device for transmitting data in a wireless communication system. A wireless device establishes a connection in an unlicensed band, and transmits an extended signal for occupying a wireless channel during a silent-free interval in the unlicensed band.

13 Claims, 11 Drawing Sheets

(51) Int. Cl.
*H04W 28/02* (2009.01)
*H04W 74/08* (2009.01)
*H04L 5/14* (2006.01)

(52) U.S. Cl.
CPC ......... *H04W 72/042* (2013.01); *H04W 74/08* (2013.01); *H04W 74/0808* (2013.01)

(56) References Cited

U.S. PATENT DOCUMENTS

| | | | |
|---|---|---|---|
| 2008/0220787 A1 | 9/2008 | Stanwood et al. | |
| 2008/0220802 A1* | 9/2008 | Yamanaka | H04W 28/06 455/522 |
| 2009/0168928 A1* | 7/2009 | Exeter | H04L 25/062 375/343 |
| 2009/0190510 A1* | 7/2009 | Kobayashi | H04L 27/2656 370/280 |
| 2010/0330994 A1* | 12/2010 | Matsuo | H04J 11/0069 455/436 |
| 2011/0134895 A1 | 6/2011 | Sakaguchi et al. | |
| 2012/0190362 A1* | 7/2012 | Subbarayudu | H04W 76/28 455/435.1 |
| 2013/0010766 A1* | 1/2013 | Sadek | H04W 72/1215 370/336 |
| 2013/0188552 A1 | 7/2013 | Kazmi et al. | |
| 2013/0337821 A1 | 12/2013 | Clegg | |
| 2014/0031031 A1* | 1/2014 | Gauvreau | H04L 5/0053 455/426.1 |
| 2014/0044105 A1 | 2/2014 | Bontu et al. | |
| 2014/0098694 A1* | 4/2014 | Damji | H04W 52/0229 370/252 |
| 2015/0131536 A1 | 5/2015 | Kaur et al. | |
| 2015/0296528 A1* | 10/2015 | Coffey | H04L 1/0021 370/338 |
| 2016/0081010 A1* | 3/2016 | Seok | H04W 74/0816 370/329 |

OTHER PUBLICATIONS

Beluri et al., "Mechanisms for LTE coexistence in TV white space," Dynamic Spectrum Access Networks (DYSPAN), 2012 IEEE International Symposium on, IEEE, 2012, pp. 317-326.

Ratasuk et al., "License-exempt LTE deployment in heterogeneous network," Wireless Communication Systems (ISWCS), 2012 International Symposium on, IEEE, 2012, pp. 246-250.

* cited by examiner

FIG. 9
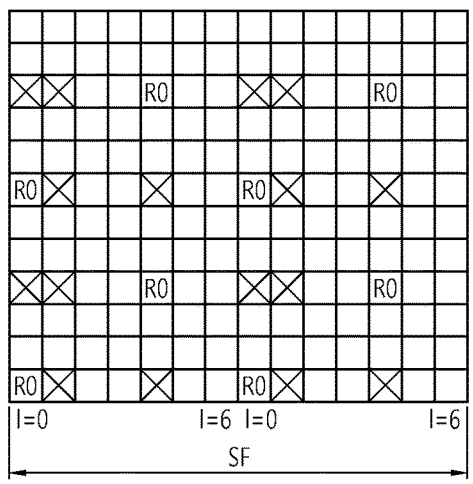
Antenna port 0
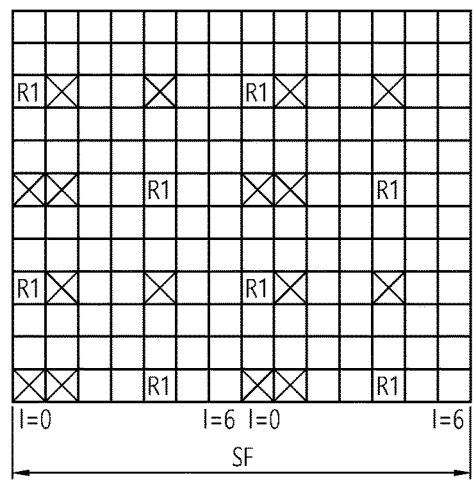
Antenna port 1
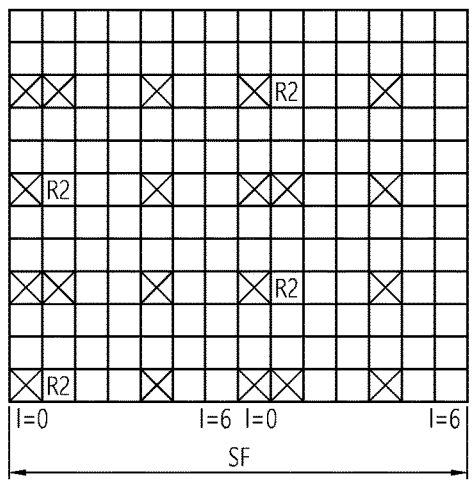
Antenna port 2
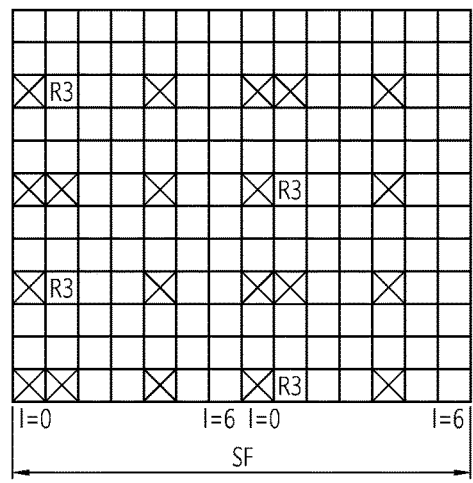
Antenna port 3

Antenna port 0

METHOD AND DEVICE FOR TRANSMITTING DATA IN UNLICENSED BAND

CROSS REFERENCE TO RELATED APPLICATIONS

This application is the National Phase of PCT International Application No. PCT/KR2015/006575, filed on Jun. 26, 2015, which claims priority under 35 U.S.C. 119(e) to U.S. Provisional Application No. 62/017,806, filed on Jun. 26, 2014, and U.S. Provisional Application No. 62/075,901, filed on Nov. 6, 2014, all of which are hereby expressly incorporated by reference into the present application.

BACKGROUND OF THE INVENTION

Field of the Invention

The present invention relates to wireless communications, and more particularly, to a method and apparatus for data transmission using an unlicensed band in a wireless communication system.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Since various wireless access techniques perform the CCA in the unlicensed band, there is a need for a method capable of reducing an interference.

SUMMARY OF THE INVENTION

The present invention provides a method and apparatus for data transmission using an unlicensed band.

In an aspect, a method for transmitting data in a wireless communication system includes establishing, by a wireless device, a connection in an unlicensed band, and transmitting, by the wireless device, an extension signal for occupying a radio channel during a silent duration in the unlicensed band.

The silent duration may be located prior to a next subframe of a special (S) subframe of time division duplex (TDD).

The silent duration may be located next to a downlink pilot time slot (DwPTS) in an S subframe of TDD.

If there is no transmission in a previous transmission time interval (TTI) of a current TTI, the silent duration may be located prior to the current TTI.

If there is no transmission in a next TTI of a current TTI, the silent duration may be located next to the current TTI.

In another aspect, a device for transmitting data in a wireless communication system includes a radio frequency (RF) unit configured to transmit and receive a radio signal, and a processor operatively coupled to the RF unit. The processor is configured to control the RF unit to establish, a connection in an unlicensed band, and control the RF unit to transmit an extension signal for occupying a radio channel during a silent duration in the unlicensed band.

An interference can be reduced in an environment where various communication protocols coexist in an unlicensed band.

BRIEF DESCRIPTION OF THE DRAWINGS

FIG. 9 shows an example of cell specific reference signal (CRS) transmission in 3GPP LTE.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. Alternatively, the wireless device may be a device supporting a data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

It is described hereinafter that the present invention is applied based on 3rd generation partnership project (3GPP) long term evolution (LTE) based on 3GPP Technical Specification (TS). This is for exemplary purposes only, and the present invention is also applicable to various wireless communication systems.

A wireless device may be served by a plurality of serving cells under carrier aggregation (CA) or dual connectivity. Each serving cell may be defined by a downlink (DL) component carrier (CC) or a pair of a DL CC and an uplink (UL) CC.

A serving cell may be classified into a primary cell and a secondary cell. The primary cell operates at a primary frequency, performs an initial connection establishment procedure, initiates a connection reestablishment procedure or is designated as a primary cell during a handover. The primary cell may be referred to as a reference cell. The secondary cell operates at a secondary frequency and is configured after establishing a radio resource control (RRC) connection. The secondary cell is used to provide additional radio resources. At least one primary cell is always configured but the secondary cell may be added/modified/released by a upper layer signaling (e.g. RRC message).

A cell index (CI) of the primary cell may be fixed. For example, lowest CI may be set as the CI of the primary cell. Hereinafter, the CI of the primary cell is set to zero and the CI of a secondary cell may be assigned subsequently starting from one.

In communication system, there are two duplex schemes: time division duplex (TDD) and frequency division duplex (FDD). In TDD, uplink communication and downlink communication uses a same frequency band. In FDD, uplink communication and downlink communication uses different frequency bands.

Figure 1:
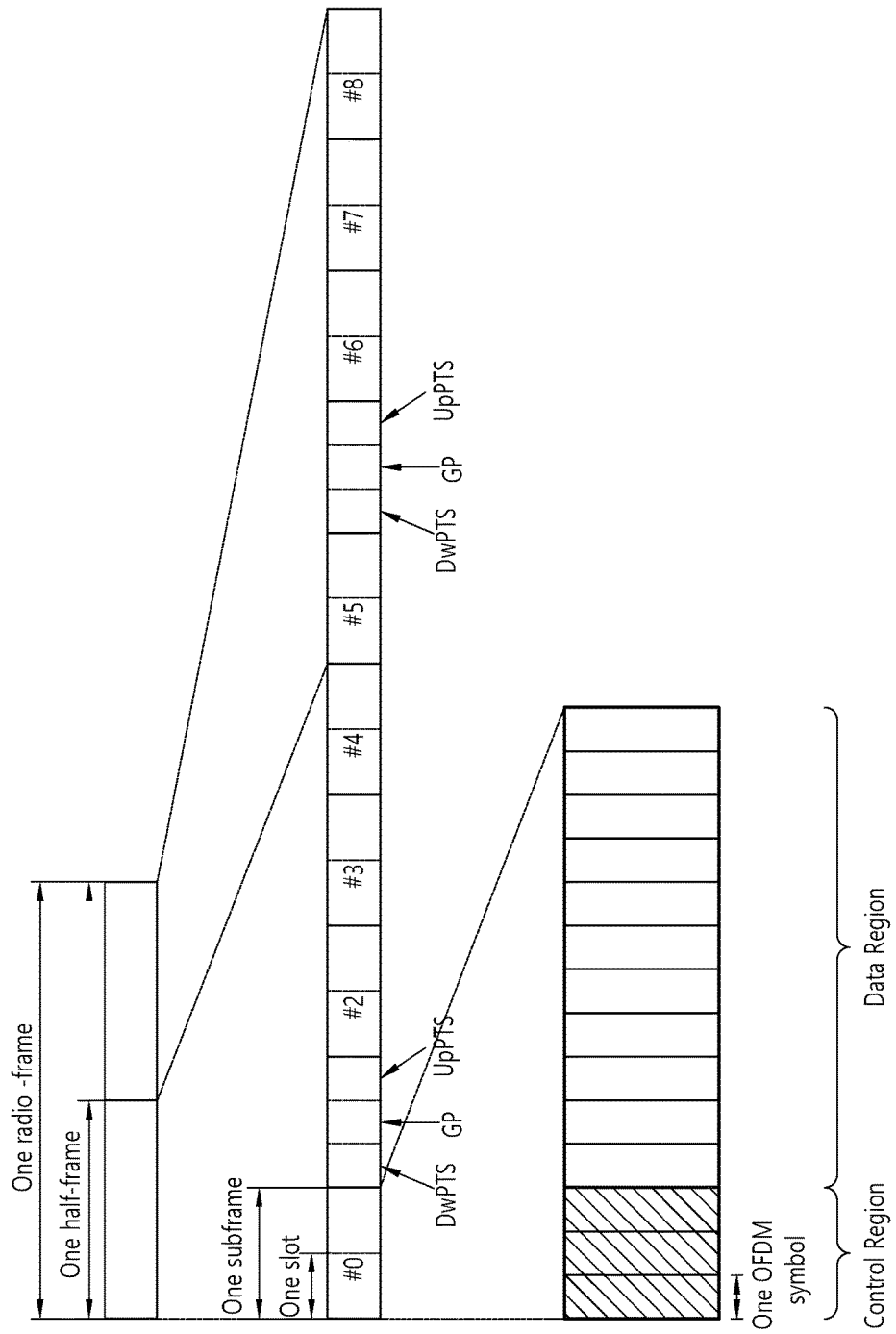
FIG. 1 shows a structure of a downlink radio frame in $3^{rd}$ generation partnership project (3GPP) long term evolution (LTE) of time division duplex (TDD).

FIG. 1 shows a structure of a downlink radio frame in 3GPP LTE TDD. The section 4 of 3GPP TS 36.211 V10.2.0 (2011-06) "Evolved Universal Terrestrial Radio Access (E-UTRA); Physical Channels and Modulation (Release 10)" may be incorporated herein by reference.

A subframe is a unit for scheduling in 3GPP LTE. For example, one subframe may have a length of 1 millisecond (ms) which is referred as a transmission time interval (TTI). A radio frame includes 10 subframes and one subframe includes 2 consecutive slots. A subframe may include a plurality of orthogonal frequency division multiplexing (OFDM) symbols. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc. According to 3GPP LTE, in case of a normal cyclic prefix (CP), one subframe includes 14 OFDM symbols, and in case of an extended CP, one subframe includes 12 OFDM symbols.

Subframes having indexes #1 and #6 are called as special (S) subframes. A S subframe may include a downlink pilot time slot (DwPTS), a guard period (GP) and a uplink pilot time slot (UpPTS). The DwPTs may be used for initial cell search, synchronization and channel estimation. The UpPTS may be used for channel estimation at a BS, uplink synchronization at a wireless device. The GP, also called as a gap, may be a duration to mitigate uplink interference due to multi-path delay of a downlink signal between downlink and uplink.

In TDD, a subframe may be a DL subframe or a UL subframe. Table 1 shows an example of radio frame configuration.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe and 'S' denotes a S subframe. When a UL-DL configuration is received from a BS, a wireless device can know which subframe is a DL subframe or a DL subframe in accordance with the UL-DL configuration.

A DL subframe is classified into a control region and a data region in the time domain. The control region includes up to first four OFDM symbols of a 1st slot in the subframe. However, the number of OFDM symbols included in the control region may vary. A physical downlink control channel (PDCCH) and other control channels are allocated to the control region, and a physical downlink shared channel (PDSCH) is allocated to the data region.

Physical channels of 3GPP LTE may be classified into a DL physical channels and UL physical channels. The DL physical channels include a physical downlink control channel (PDCCH), a physical control format indicator channel (PCFICH), a physical hybrid-ARQ indicator channel (PHICH) and a physical downlink shared channel (PDSCH). The UL physical channels include a physical uplink control channel (PUCCH) and a physical uplink shared channel (PUSCH).

Figure 2:
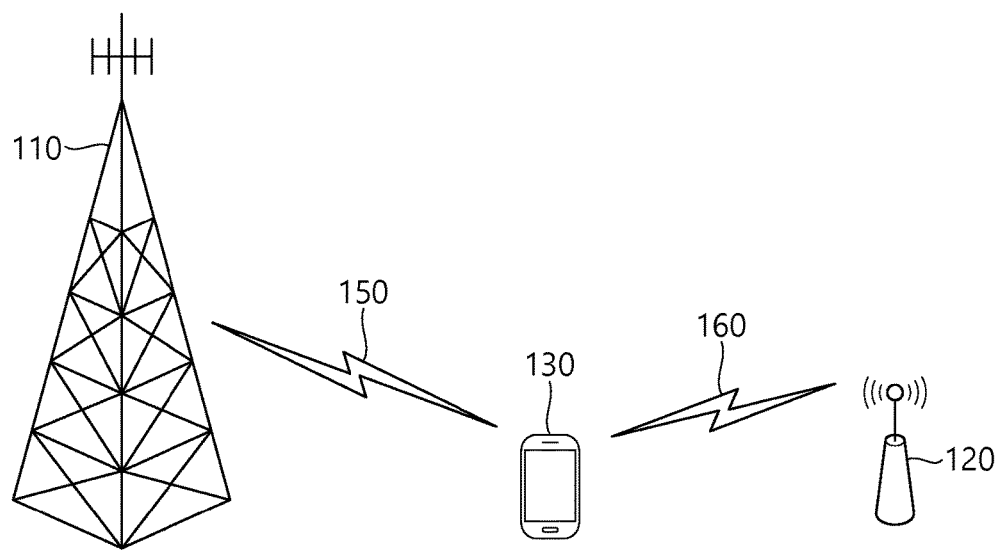
FIG. 2 shows an example of an LTE service using an unlicensed band.

FIG. 2 shows an example of an LTE service using an unlicensed band.

A wireless device 130 establishes a connection with a $1^{st}$ BS 110, and receives a service through a licensed band. For traffic offloading, the wireless device 130 may receive a service through an unlicensed band with respect to a $2^{nd}$ BS 120.

The $1^{st}$ BS 110 is a BS supporting an LTE system, whereas the $2^{nd}$ BS 120 may also support other communication protocols such as a wireless local area network (WLAN) in addition to LTE. The $1^{st}$ BS 110 and the $2^{nd}$ BS 120 may be associated with a carrier aggregation (CA) environment, and a specific cell of the $1^{st}$ BS 110 may be a primary cell. Alternatively, the $1^{st}$ BS 110 and the $2^{nd}$ BS 120 may be associated with a dual connectivity environment, and a specific cell of the $1^{st}$ BS 110 may be a primary cell. In general, the $1^{st}$ BS 110 having the primary cell has wider coverage than the $2^{nd}$ BS 120. The $1^{st}$ BS 110 may be called a macro cell. The $2^{nd}$ BS 120 may be called a small cell, a femto cell, or a micro cell. The $1^{st}$ BS 110 may operate the primary cell and zero or more secondary cells. The $2^{nd}$ BS 120 may operate one or more secondary cells. The secondary cell may be activated/deactivated by an indication of the primary cell.

The above description is for exemplary purposes only. The $1^{st}$ BS 110 may correspond to the primary cell, and the $2^{nd}$ BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. It is assumed in the unlicensed band that a channel is occupied basically through contention between respective communication nodes. Therefore, in communication in the unlicensed band, it is required to confirm that signal transmission is not achieved by other communication nodes by performing channel sensing. This is called clear channel assessment (CCA). The unlicensed band may include 2.4 GHz and/or 5 GHz band used in a WLAN.

The CCA must be performed preferentially in order for a BS or wireless device of an LTE system to have access to a channel in an unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, the LTE and the WLAN are described for example as a communication protocol used in the unlicensed band. This is for exemplary purposes only, and thus it may also be said that a $1^{st}$ communication protocol and a $2^{nd}$ communication protocol are used in the unlicensed band. A base station (BS) supports the LTE. A UE is a device supporting the LTE.

Figure 3:
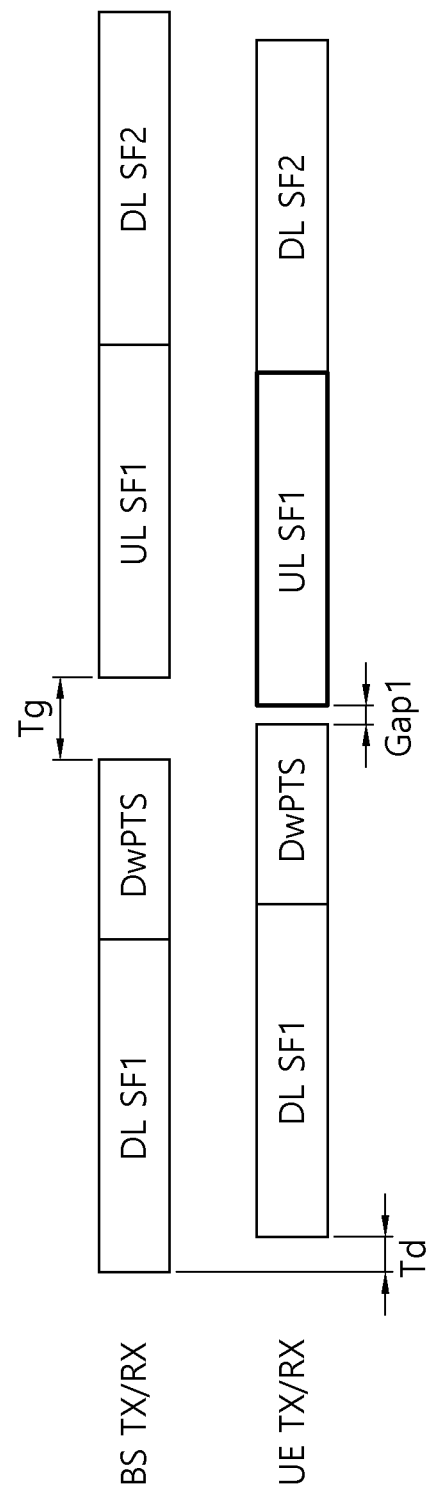
FIG. 3 shows an interference control using a special (S) subframe of LTE TDD.

FIG. 3 shows an interference control using a special (S) subframe of LTE TDD.

A DL SF is a DL subframe, and a UL SF is a UL subframe. For convenience, UpPTS is omitted.

The S subframe is a duration in which DL-UL switching occurs, and is used to avoid a collision between a DL signal and a UL signal when a BS-UE propagation delay (indicated by 'Tg') occurs during a GP.

From a BS perspective, there is no transmission/reception signal during the Tg. From a UE perspective, there is no transmission/reception signal during a Gap1. For convenience, such a duration is called a silent duration.

If the silent duration is longer than a duration required for a communication node of another system such as WLAN or a communication node of an LTE system operating with CCA to declare the CCA, these nodes may start to transmit a signal. This is because a CCA level of the silent duration is lower than a CCA threshold. Therefore, a channel of another communication node may cause an interference on a DL signal of the BS or a UL signal of the UE.

Figure 4:
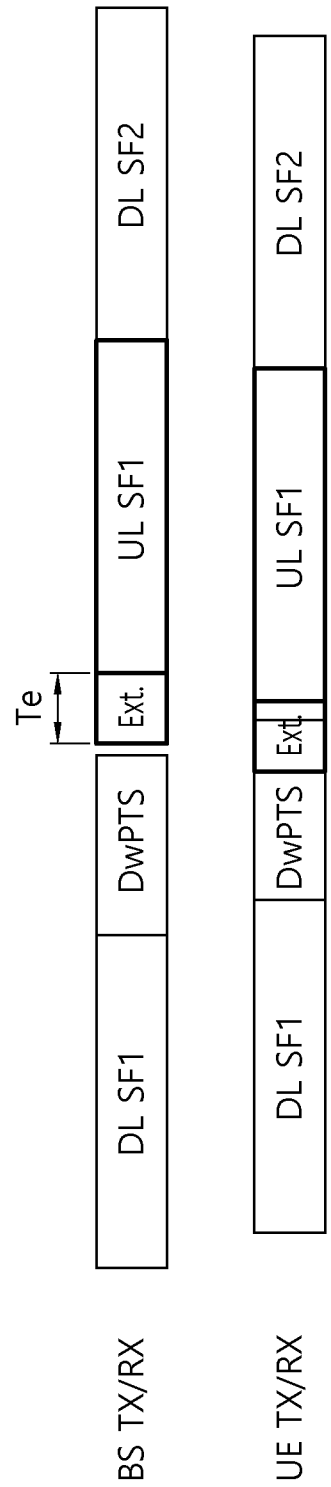
FIG. 4 shows data transmission according to an embodiment of the present invention.

FIG. 4 shows data transmission according to an embodiment of the present invention.

An extension signal is transmitted between an S subframe and a next subframe. For example, it is assumed that the next subframe of the S subframe is a UL SF1. The extension signal is transmitted before the start of the UL SF1. Alternatively, even if it is not before the start of the UL SF, the extension signal may be transmitted before the start of UL data transmission such as UpPTS or the like.

A length Te of the extension signal may be equal to or longer than a length obtained by subtracting a time required to declare CCA in a GP of the S subframe. Since the extension signal is transmitted in a silent duration due to DL-UL switching, WLAN devices can be prevented from performing the CCA and accessing a channel during the silent duration. That is, a CCA level of the silent duration is increased by a CCA threshold due to the extension signal, and thus a WLAN device or another LTE device recognizes that a channel is busy.

A UE may ignore reception for a portion overlapping with a duration in which the UE transmits the extension signal during a DwPTS duration in which reception from a BS is achieved.

The extension signal may be an extension of DwPTS, a duplication of DwPTS, an extension of UpPTS, a duplication of UpPTS, an extension of cyclic prefix (CP), or a predetermined sequence.

A length of an extension signal for channel occupation and/or whether to transmit the extension signal may be reported by the BS to the UE. The information may be determined in a semi-statistic manner through radio resource control (RRC) signaling, or may be dynamically indicated through a physical layer signal such as a PDCCH or the like.

Figure 5:
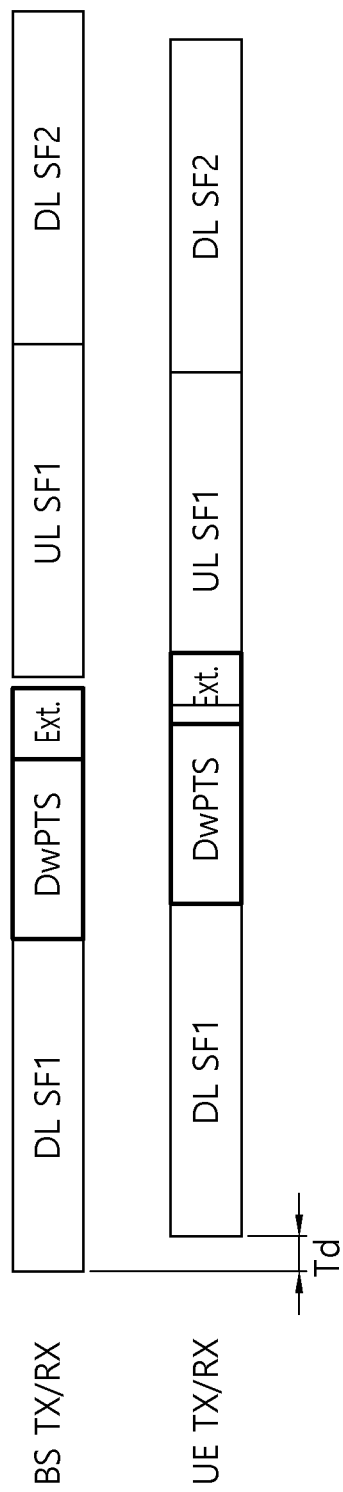
FIG. 5 shows data transmission according to another embodiment of the present invention.

FIG. 5 shows data transmission according to another embodiment of the present invention.

Comparing with the embodiment of FIG. 4, an extension signal is transmitted immediately after a DwPTS duration of an S subframe. An effect of transmitting the extension signal can be expected when performing transmission by further extending a signal of the DwPTS duration.

A length Te of the extension signal may be equal to or longer than a time length obtained by subtracting a time required to declare CCA from a maximum round trip delay in a GP duration of the S subframe or in a corresponding cell coverage.

Figure 6:
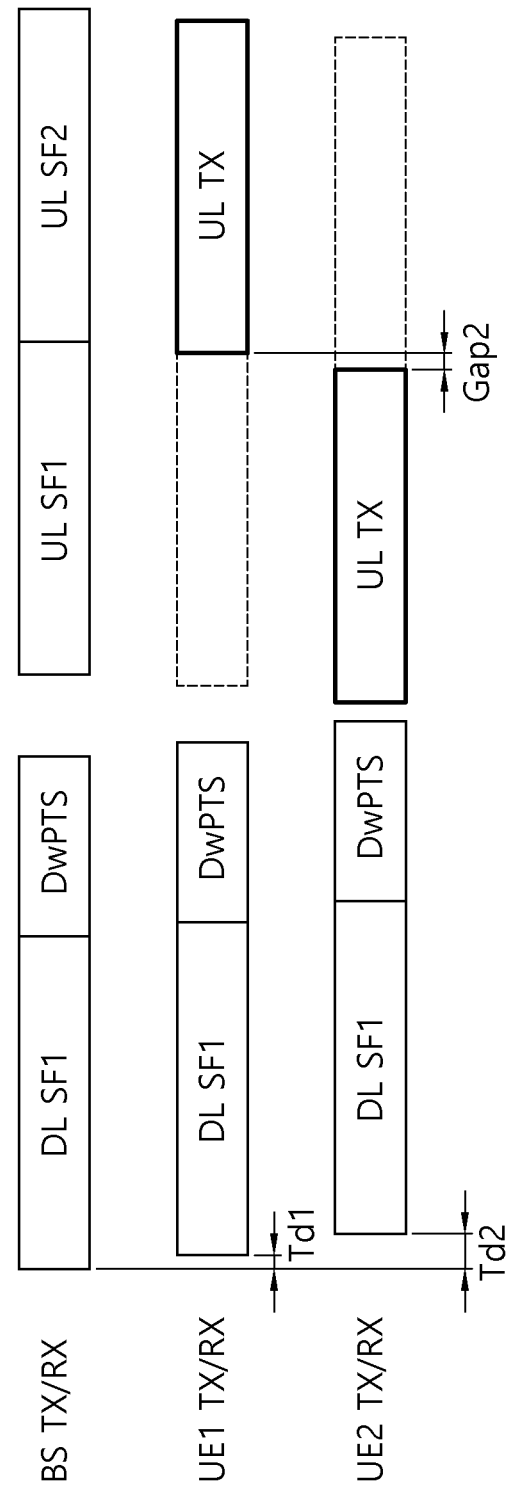
FIG. 6 shows an example of a silent duration in transmission performed by a plurality of user equipments (UEs).

FIG. 6 shows an example of a silent duration in transmission performed by a plurality of UEs. This example shows that uplink transmission is performed in consecutive subframes by UEs having different TTI boundaries from a UE transmission perspective due to different propagation delays in a TDD system.

A silent duration (indicated by 'Gap2') occurs due to different TTI boundaries between a time at which a UE2 ends UL transmission and a time at which a UE1 starts UL transmission. An interference may occur due to a CCA declaration of another communication node similarly to the S subframe shown in FIG. 4 and FIG. 5. The silent duration may also occur not only in a TDD system but also in an FDD system.

Figure 7:
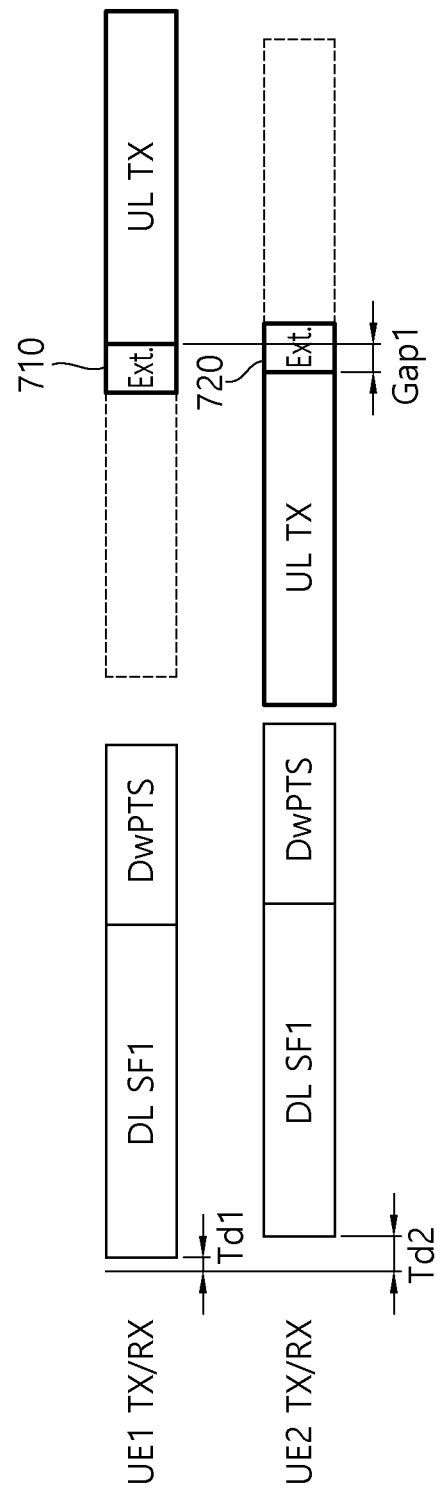
FIG. 7 shows data transmission according to another embodiment of the present invention.

FIG. 7 shows data transmission according to another embodiment of the present invention.

When a UL signal (e.g., PUSCH/PUCCH, etc.) is transmitted in one TTI, if there is no transmission in an immediate previous TTI, a UE1 may first transmit an extension signal 710 before the TTI.

Alternatively, when a UL signal is transmitted in one TTI, if there is no transmission in an immediate next TTI, a UE2 may transmit an extension signal 720 after the TTI.

A length of an extension signal for channel occupation and/or whether to transmit the extension signal may be reported by the BS to the UE. The information may be determined in a semi-statistic manner through radio resource control (RRC) signaling, or may be dynamically indicated through a physical layer signal such as a PDCCH or the like.

A length Te of the extension signal may be equal to or longer than a time length obtained by subtracting a time required to declare CCA from a maximum round trip delay in a GP duration of the S subframe or in a corresponding cell coverage.

Figure 8:
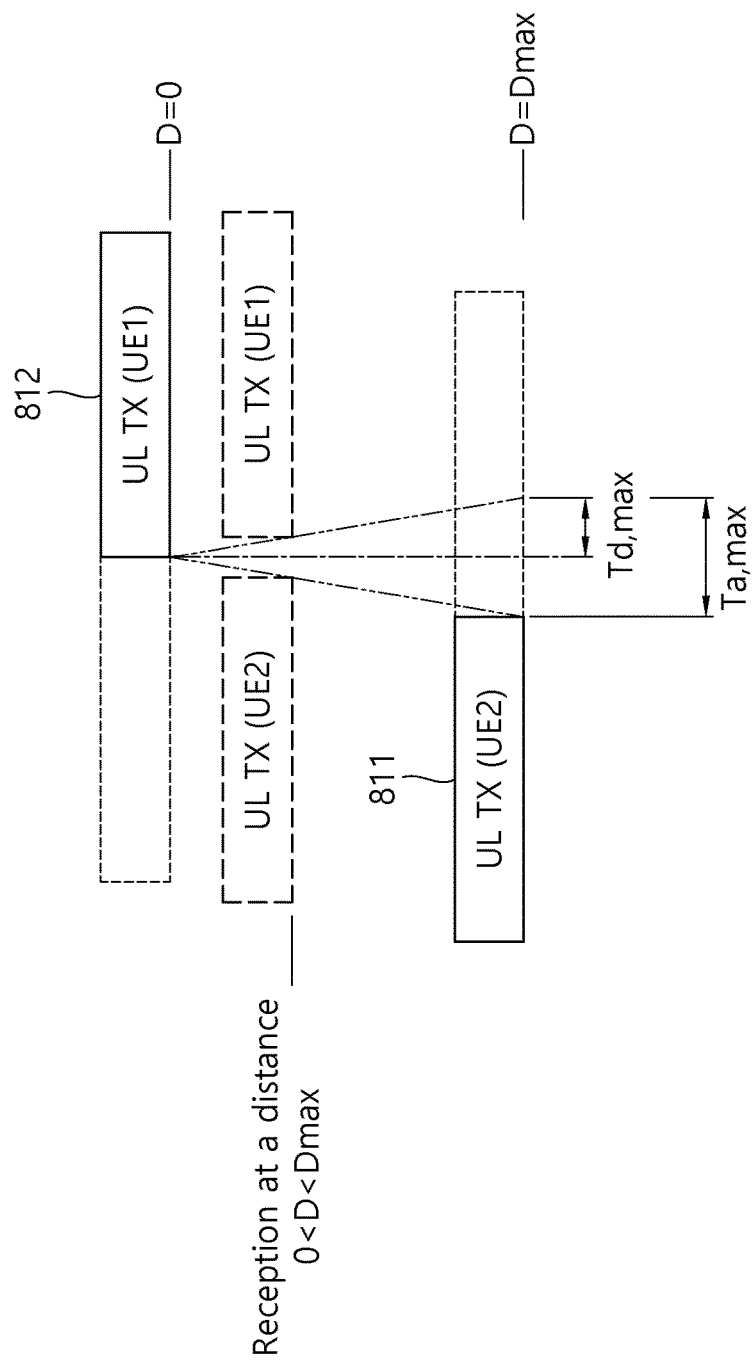
FIG. 8 shows an example of a silent duration.

FIG. 8 shows an example of a silent duration.

It is assumed that a distance between a BS and a UE is 'D'. It is assumed that a UE1 is located very close to a BS, and a UE2 is located farthest from the BS. The UE2 is separated by Dmax from the BS. In case of the UE1, D may be 0.

It is assumed that a round trip delay is Td. A timing advance (TA) Ta,max of the UE2 may be set to double of Td,max. In comparison thereto, the TA of the UE1 may be almost 0.

It is assumed that the UE2 transmits a UL signal in a $1^{st}$ subframe 811, and the UE2 transmits a UL signal in a $2^{nd}$ subframe 812 which is a next subframe of the $1^{st}$ subframe 811. In this case, a duration between a time at which transmission of the UE2 ends and a time at which transmission of the UE1 starts may be regarded as a silent duration in which there is no transmission/reception. That is, the silent duration may be a duration equivalent to a difference between the UE1 and the UE2.

In order to avoid a channel access caused when another communication node performs CCA in the silent duration, transmission of an extension signal is proposed.

The extension signal may be an extension or duplication of previous data, an extension or duplication of next data, an extension of a cyclic prefix (CP), or a predetermined sequence.

A length of the extension signal and/or whether the extension signal exists may be reported by the BS to the UE.

FIG. 9 shows an example of cell specific reference signal (CRS) transmission in 3GPP LTE.

In an LTE system, a BS transmits a CRS of antenna ports 0 to 3 through some OFDM symbols of a DL subframe. In the figure, R0, R1, R2, R3 denote a CRS of a corresponding antenna port, and l denotes an OFDM symbol index in a slot. Since a DL subframe includes 14 OFDM symbols in a normal CP, l=0, . . . , 6.

A reference signal (RS) sequence for the CRS may be defined as follows.

$$r(m)=1/\sqrt{2}(1-2\cdot c(2m))+j1/\sqrt{2}(1-2\cdot c(2m+1))$$ [Equation 1]

Herein, m=0, 1, . . . , $2N_{BB}-1$, and $N_{BB}$ denotes a bandwidth for transmitting the CRS. A pseudo-random sequence c(i) may be defined by a Gold sequence as follows.

$$c(n)=(x_1(n+Nc)+x_2(n+Nc))\mod 2$$

$$x_1(n+31)=(x_1(n+3)+x_1(n))\mod 2$$

$$x_2(n+31)=(x_2(n+3)+x_2(n+2)+x_2(n+1)+x_2(n))\mod 2$$ [Equation 2]

Herein, Nc is integer, n=0, . . . , N−1, N denotes a sequence length, and 'mod' denotes a modulo operation. A $1^{st}$ m-sequence is initialized to $x_1(0)=1$, $x_1(n)=0$, m=1, 2, . . . , 30. A $2^{nd}$ m-sequence may be initialized to $2^{10}(7(ns+1)+l+1)(2Ni+1)+2Ni+Ncp$. ns is a slot number in a radio frame, and Ni is a cell ID. Ncp is 1 in a normal CP case, and is 0 in an extended CP case.

If signals other than the CRS are not transmitted in a specific subframe when the BS performs DL transmission in an unlicensed band, an OFDM symbol (e.g., an OFDM symbol with l=2,3) in which the CRS is not transmitted is a silent duration. Therefore, during this silent duration, another communication node may declare CCA and start signal transmission.

Accordingly, it is proposed a method of preventing another communication node from declaring the CCA by transmitting an extension signal on an OFDM symbol not transmitting a CRS.

Figure 10:
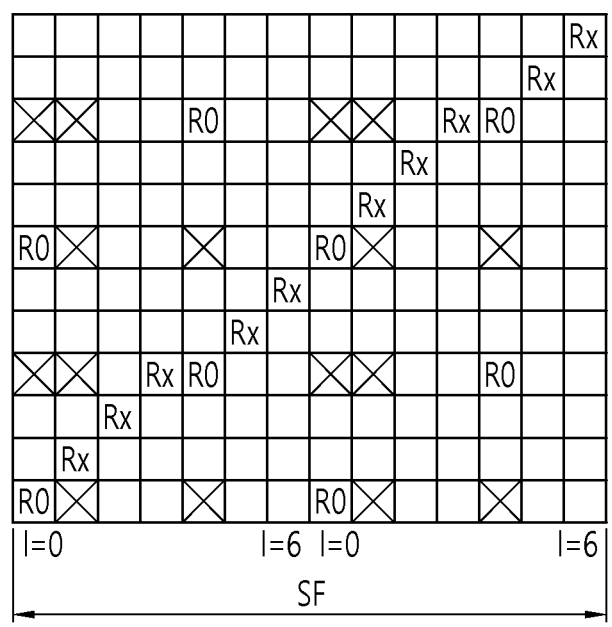
FIG. 10 shows transmission of an extension signal according to an embodiment of the present invention.

FIG. 10 shows transmission of an extension signal according to an embodiment of the present invention.

An extension signal (indicated by 'Rx') for avoiding CCA is transmitted on an OFDM symbol on which a CRS is not transmitted. To avoid a confusion in reception, a resource element (RE) used in conventional CRS transmission is not used in transmission of the extension signal.

This indicates transmission of the extension signal when a CRS of the antenna port 0 is transmitted. If a CRS of the antenna port 2 is added, the extension signal may not be transmitted on an OFDM symbol on which the CRS of the antenna port 2 is transmitted. In this case, under the assumption that the extension signal is transmitted through the same antenna port as the CRS of the antenna port 0 or experiences the same radio channel characteristic as the antenna port 0, the UE can improve channel estimation performance by using the extension signal in DL channel estimation together with the CRS of the antenna port 0.

The extension signal may be transmitted on an OFDM symbol not transmitting any DL signal. For example, the extension signal may not be transmitted on an OFDM symbol for transmitting CRS, URS (UE specific reference signal), CSI-RS (channel state information-reference signal), PRS (positioning reference signal), PSS (primary synchronization signal), SSS (secondary synchronization signal), PBCH, etc.

The extension signal may be transmitted by using an RE used in CRI-RS, PRS, or URS transmission or a shifted RE.

The extension signal may be generated by using a sequence used in CRS, CSI-RS, PRS, or URS transmission. The extension signal may be initialized by using a specific value given from the BS while using the sequence of Equation 1.

In order to avoid a data throughput decrease caused by transmission of the extension signal, a region for transmitting the extension signal may not be considered in RE mapping and coded bit generation of a PDCCH or PDSCH to be transmitted. The region for transmitting the extension signal may not be considered in PDSCH or PDCCH coding. An RE used in PDSCH or PDCCH transmission may be punctured to be used in transmission of the extension signal.

Whether to transmit the extension signal may be reported by the BS to the UE.

The UE for receiving the PDSCH in any subframe may assume that the extension signal is not transmitted in a region in which the UE receives the PDSCH in a corresponding subframe.

Now, DL/UL transmission for satisfying a bandwidth regulation is proposed.

In order to facilitate an operation for coexisting with another wireless device in an unlicensed band of a specific region, it is mandated in an article of a communication regulation that a signal is transmitted through a bandwidth equal to or higher than a specific bandwidth which is in proportional to a full system bandwidth. Hereinafter, a bandwidth through which the wireless device is mandated to transmit a signal is called an "occupied bandwidth".

In LTE, a fixed band signal is designed to be transmitted only in a specific bandwidth. For example, an example of a DL signal includes PSS, SSS, RS, PBCH, etc., and an example of a UL signal includes PUCCH, SRS, etc. Transmission of the fixed band signal may not satisfy a corresponding regulation. Further, transmission of a signal of which a transmission bandwidth varies depending on data scheduling such as PDSCH/PUSCH may not satisfy the corresponding regulation.

Accordingly, when the BS or the UE transmits the fixed band signal, an occupation signal may be transmitted through an additional bandwidth other than the existing specific bandwidth so that the occupied bandwidth is satisfied. The occupation signal may be transmitted through one or more subcarriers on which the fixed band signal is not transmitted in the occupied bandwidth.

More specifically, the occupation signal may be configured by using the following methods or a combination thereof.

1. A signal transmitted with power equal to or higher than a specific level
2. A modulation symbol (e.g., BPSK/QPSK/m-QAM) modulated with any bit for each subcarrier
3. A modulation symbol modulated with a bit generated by using a seed value (e.g., cell ID, UE ID, subframe index, radio frame index, etc.) shared between the BS and the UE
4. A reuse of a DL CRS/DM-RS/CSI-RS/PRS sequence
5. A sequence (constant amplitude zero autocorrelation (CAZAC) sequence, etc.) selected for each OFDM symbol
7. A sequence selected for each OFDM symbol by using a seed value (e.g., cell ID, UE ID, subframe index, radio frame index, etc.) shared between the BS and the UE
8. A reuse of a UL RS/SRS sequence In the above method, the occupation signal may be transmitted through the entirety of the occupied bandwidth or may be transmitted through a part of the occupied bandwidth. The occupation signal may be transmitted through a different band (or a different subcarrier) for each OFDM symbol.

During a specific time duration, the occupation signal may be transmitted in a part of the time duration. The occupation signal may be transmitted in the same OFDM symbol as the fixed band signal or may be transmitted in another OFDM symbol. The occupation signal may be transmitted in a band other than a band occupied by the fixed band signal in the time duration.

Figure 11:
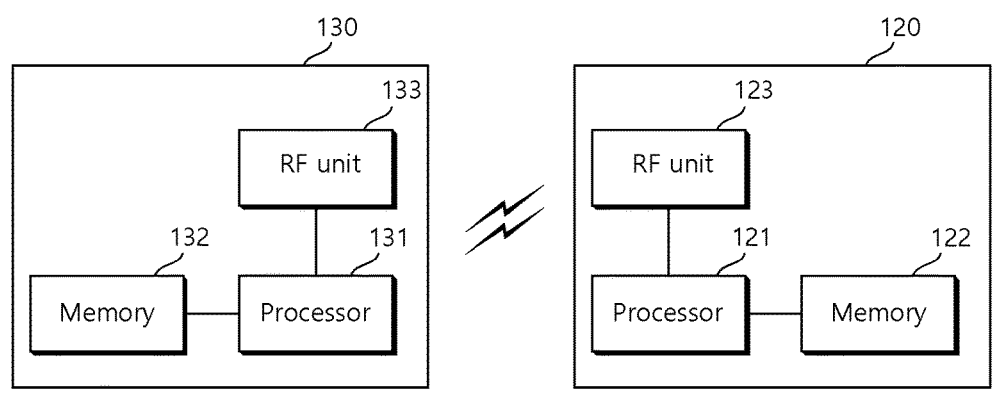
FIG. 11 is a block diagram showing a wireless communication system according to an embodiment of the present invention.

FIG. 11 is a block diagram showing a wireless communication system according to an embodiment of the present invention.

A wireless device 130 includes a processor 131, a memory 132, and a radio frequency (RF) unit 133. The memory 132 is coupled to the processor 131, and stores various instructions executed by the processor 131. The RF unit 133 is coupled to the processor 131, and transmits and/or receives a radio signal. The processor 131 implements the proposed functions, procedures, and/or methods. In the aforementioned embodiment, an operation of the wireless device may be implemented by the processor 131. When the aforementioned embodiment is implemented with a software instruction, the instruction may be stored in the memory 132, and may be executed by the processor 131 to perform the aforementioned operation.

A BS 120 includes a processor 121, a memory 122, and an RF unit 123. The BS 120 may operate in an unlicensed band. The memory 122 is coupled to the processor 121, and stores various instructions executed by the processor 121. The RF unit 123 is coupled to the processor 121, and transmits and/or receives a radio signal. The processor 121 implements the proposed functions, procedures, and/or methods. In the aforementioned embodiment, an operation of the BS may be implemented by the processor 121.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting data in a wireless communication system, the method comprising:
   establishing, by a wireless device, a connection in an unlicensed band; and
   transmitting, by the wireless device, an extension signal during a silent duration in a specific subframe in the unlicensed band,
   wherein the silent duration includes orthogonal frequency division multiplexing (OFDM) symbols in which a cell-reference signal (CRS) is not transmitted if the CRS is only transmitted in the specific subframe, and
   wherein the extension signal is a signal that is transmitted to prevent other wireless devices from performing clear channel assessment (CCA) in the OFDM symbols in which the CRS is not transmitted.

2. The method of claim 1, wherein the silent duration is located before an uplink (UL) subframe following a special (S) subframe of time division duplex (TDD).

3. The method of claim 1, wherein the silent duration is located after a downlink pilot time slot (DwPTS) in an S subframe of TDD.

4. The method of claim 1, wherein if there is no transmission in a previous transmission time interval (TTI) of a current TTI, the silent duration is located before to the current TTI.

5. The method of claim 1, wherein if there is no transmission in a next TTI following a current TTI, the silent duration is located after the current TTI.

6. The method of claim 1, wherein the establishing of the connection in the unlicensed band by the wireless device comprises:
   establishing, by the wireless device, a connection with a first serving cell which uses a licensed band; and
   activating, by the wireless device, a second serving cell which uses the unlicensed band by an indication of the first serving cell.

7. The method of claim 1, wherein a length of the extension signal is determined by considering a time of performing the CCA by means of the other wireless devices.

8. The method of claim 1, further comprising:
   receiving, by the wireless device, information regarding at least any one of a length of the extension signal and whether to transmit the extension signal.

9. A device for transmitting data in a wireless communication system, the device comprising:
a transceiver configured to transmit and receive a radio signal; and
a processor operatively coupled to the transceiver and configured to:
control the transceiver to establish a connection in an unlicensed band; and
control the transceiver to transmit an extension signal during a silent duration in a specific subframe in the unlicensed band,
wherein the silent duration includes orthogonal frequency division multiplexing (OFDM) symbols in which a cell-reference signal (CRS) is not transmitted if the CRS is only transmitted in the specific subframe, and
wherein the extension signal is a signal that is transmitted to prevent other wireless devices from performing clear channel assessment (CCA) in the OFDM symbols in which the CRS is not transmitted.

10. The device of claim 9, wherein the silent duration is located before an uplink (UL) subframe following a special (S) subframe of time division duplex (TDD).

11. The device of claim 9, wherein the silent duration is located after a downlink pilot time slot (DwPTS) in an S subframe of TDD.

12. The device of claim 9, wherein if there is no transmission in a previous transmission time interval (TTI) of a current TTI, the silent duration is located before the current TTI.

13. The device of claim 9, wherein if there is no transmission in a next TTI following a current TTI, the silent duration is located after the current TTI.

* * * * *